No. 638,442. Patented Dec. 5, 1899.
G. W. BUTTERFIELD.
STREET CAR TRUCK FENDER.
(Application filed Oct. 19, 1898.)
(No Model.)
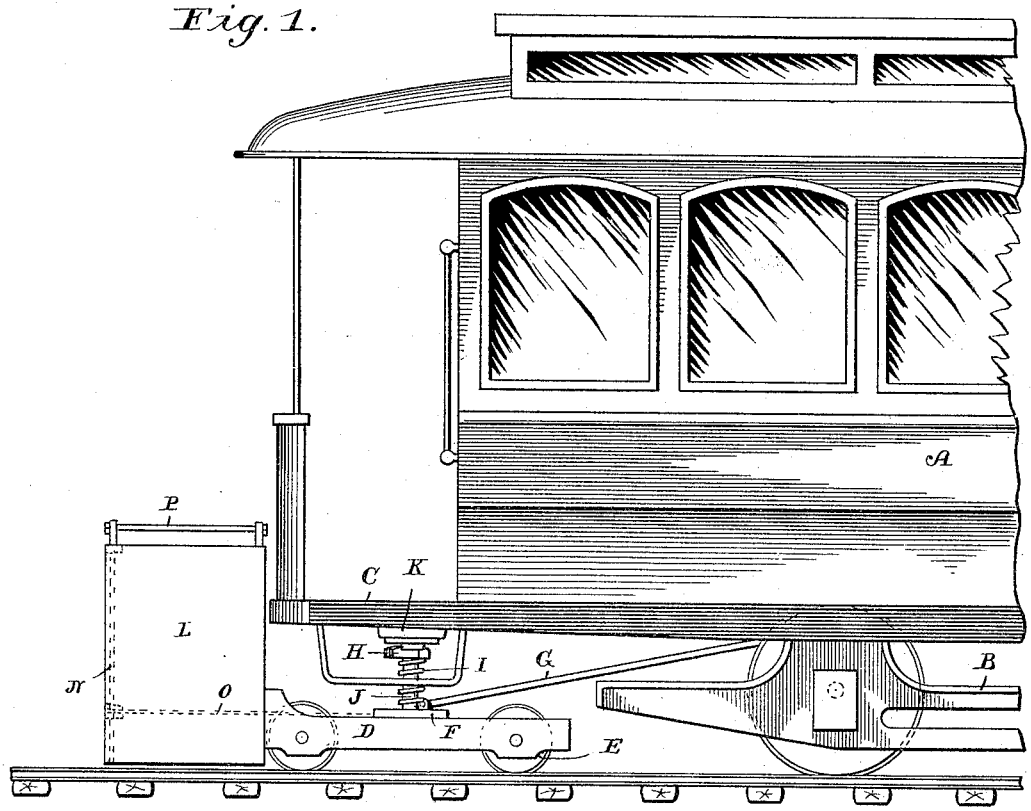
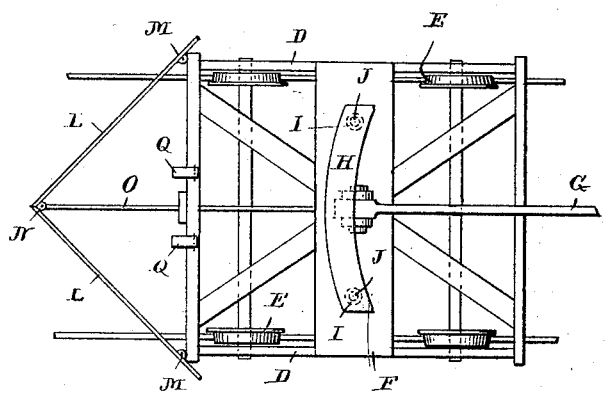
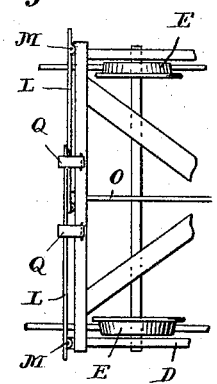
Witnesses
Harvey W. Chapman
Edward K. Nicholson
Inventor
George W. Butterfield
By Chamberlain & Newman
Attorneys

UNITED STATES PATENT OFFICE.

GEORGE W. BUTTERFIELD, OF BRIDGEPORT, CONNECTICUT.

STREET-CAR-TRUCK FENDER.

SPECIFICATION forming part of Letters Patent No. 638,442, dated December 5, 1899.

Application filed October 19, 1898. Serial No. 694,051. (No model.)

*To all whom it may concern:*

Be it known that I, GEORGE W. BUTTERFIELD, of Bridgeport, county of Fairfield, and State of Connecticut, have invented a new and useful Street-Car-Truck Fender, of which the following is a specification, reference being had therein to the accompanying drawings.

This invention relates to new and useful improvements in street-car-truck fenders, and is particularly adapted for use in connection with trolley-cars and the like.

It is the object of my invention to furnish a simple, economical, and safe fender which runs close to and always covering the rails of the track; presenting a smooth engaging surface moving diagonally along said rails, and whereby any and all obstructions which may appear upon the track are removed to either side.

A further object of my invention is to construct said fender in such a manner as to permit of its being folded together in a small space when not in use, and, finally, by my especially-designed truck I afford additional support to a car.

With the above objects in view my invention resides and consists in the novel construction and combination of parts set forth in the accompanying drawings, forming a part of this specification, and upon which similar characters of reference denote like or corresponding parts throughout the several figures, and of which—

Figure 1 shows a side elevation of my fender complete and attached to one end of a car. Fig. 2 is a detached plan view of the fender and its truck disconnected. Fig. 3 is a detail plan view of the front portion of the fender-truck, the fender proper being shown in a closed position.

As will be obvious, my invention is applicable to any form of car, since the fender proper is supported wholly upon a truck of its own, said truck being attached to the car or the car-truck and is operated in advance of the latter and beneath the platform of the car, so that the fender proper will at all times be stationed immediately in front of said platform.

Referring in detail by characters of reference to the several figures of the drawings, A represents a car, B its truck, and C the platform, all of which may be of the usual or any preferred construction, since they form no part of my invention.

D represents the framework, and E the wheels, of the truck for my fender, said wheels serving to run upon the rails of the track in a manner to support the truck thereon.

F represents a central cross-plank of the truck and to which I attach the forward end of a connecting-rod G, the rear end of which rod may be connected to the under side of the car or to its truck. This rod connects the car and fender-truck in a manner to operate the latter in advance of the car-truck, as desired.

Upon the central plank of the truck is located a rest H, which is supported upon springs I, encircling guide-pins J, as shown. Said rest is preferably of a circular form and in practice is engaged by a shoe K, secured to the under side of the platform of the car. The object of the construction is to lend additional support to the car and prevent the undesirable vibration of the latter and also to assist in holding the fender-truck upon the rails.

From the above construction it will be obvious that when turning curves and the like the fender and its truck will follow the track, thereby drawing its yieldable rest beneath the shoe and to either side.

Referring to the fender proper, it will be seen that the same consists, chiefly, of a pair of diagonally-arranged smooth guards L L, (which may be of sheet metal,) hinged to the fender-truck at M and supported thereon in an upright position diagonally to the rails of the truck. The forward ends of these guards are detachably united by means of a locking-pin M, which passes down through eyes on the inside of said guards, and also through the forward end of the slidable brace O, which latter may be attached to the frame of the truck in any suitable manner. The top of these guards are preferably provided with a hand-rail P, as shown in Fig. 1, which rail may be of any preferred construction. As before stated, the guards L L are disconnectible at their forward ends and by reason of the hinges M may be folded back against the frame of the truck, where I have provided a pair of pawls Q Q to engage and retain the same in said position. These parts are preferably folded together in this manner when the truck is trailing idly at the rear of the car, it being my intention to use two trucks, one at each end of the car, and not to change them at the end of a trip, as is the custom upon some roads.

By reason of the construction above set forth it will be seen that my fender is rigidly supported in front of the running-gear of the car and that it is carried along close to the rails at a uniform distance therefrom at all times irrespective of grades, curves, speed, or the momentum of the car, thereby insuring engagement with any and all objects which may be upon the track and in a manner to move them off from said track to the side of the road-bed with comparatively little or no injury.

Having thus described my invention, what I claim, and desire to secure by Letters Patent, is—

1. The combination in a car-fender, of a truck, with means of attachment to a car, guards supported by said truck and diagonally with the rails of the track, means for disconnecting the forward end of said guards to fold them together.

2. In a car-truck fender, the combination with a truck, of a pair of diagonally-arranged guards hinged to said truck, a detachable connection for the forward end of said guards, whereby the same may be closed back against the truck-frame and means for retaining said parts in said closed position.

3. In a car-truck fender, the combination with a truck having suitable driving connections with a car, of yieldable rests upon said truck and a shoe to engage said rest, a pair of foldable guards attached to the truck, a rod extended from the fender-truck to support the forward end of said guards and a hand-rail upon the top edge of said guards.

4. A car-fender comprising a truck with operating connections with a car, a yieldable support upon said truck for the forward end of a car, a pair of sheet-metal guards hinged to said truck-frame, and having eyes on the forward edge, a pin adapted to be placed in said eyes to unite the forward edge of said guards and a support for the forward edge of said guards.

5. The combination in a car-fender, of a truck with means of attachment to a car and serving as a support to the ends of the latter, diagonally-arranged guards foldably attached to said truck, means for retaining said guards in both an extended and folded position, substantially as described.

In testimony hereof I have hereunto set my signature in the presence of two witnesses.

GEORGE W. BUTTERFIELD.

Witnesses:
BACON WAKEMAN,
JOSÉ R. FREYRE.